June 10, 1930.　　D. H. DAVIS　　1,762,915
HEAVY DUTY TRAILER
Filed June 13, 1928　　2 Sheets-Sheet 1
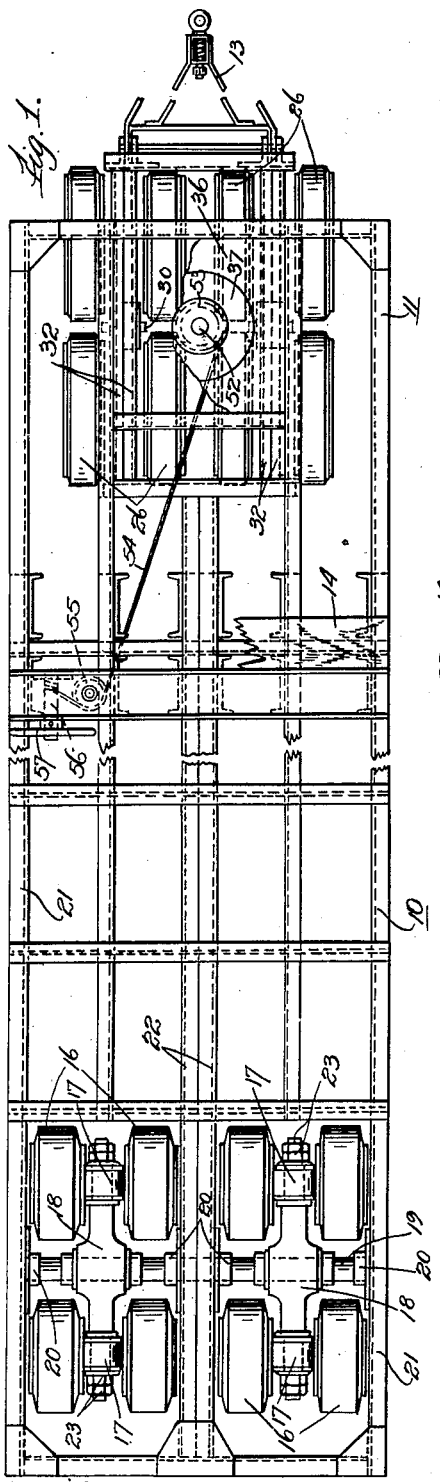
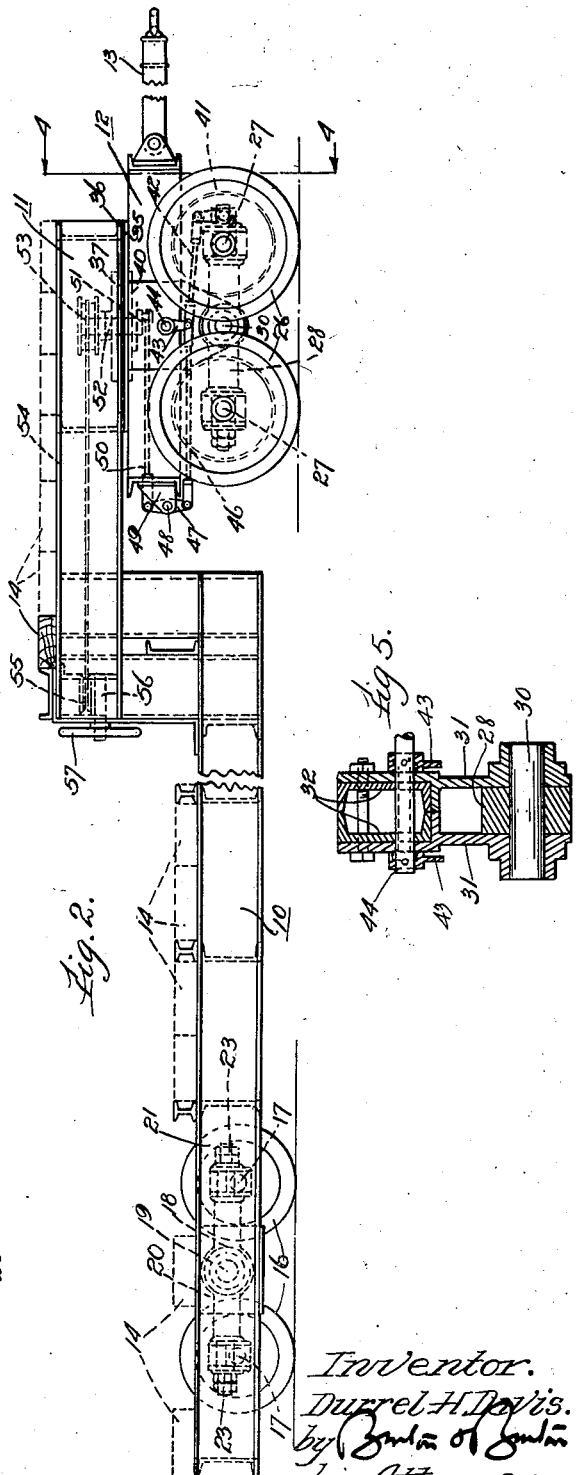

June 10, 1930.  D. H. DAVIS  1,762,915
HEAVY DUTY TRAILER
Filed June 13, 1928  2 Sheets-Sheet 2
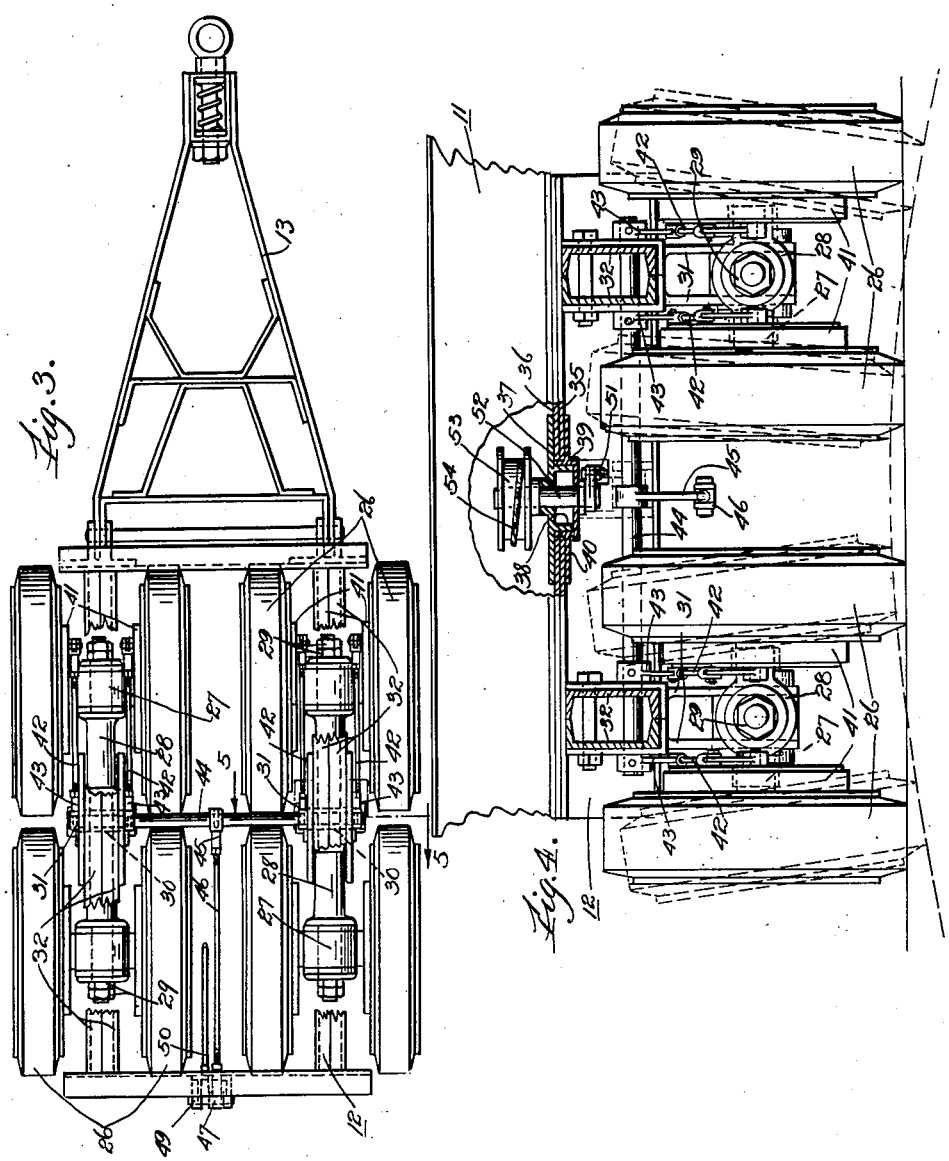
Inventor
Durrel H. Davis
by his Attorneys.

Patented June 10, 1930

1,762,915

UNITED STATES PATENT OFFICE

DURREL H. DAVIS, OF EDGERTON, WISCONSIN, ASSIGNOR TO HIGHWAY TRAILER COMPANY, OF EDGERTON, WISCONSIN, A CORPORATION OF WISCONSIN

HEAVY-DUTY TRAILER

Application filed June 13, 1928. Serial No. 284,894.

This invention relates to vehicles and more particularly to trailers of the heavy duty type, and has for an object to provide an improved construction wherein the normal raising and lowering of the frame resulting from traversing an uneven road bed, is considerably reduced. Another object is to mount the supporting wheels on compensating axles by means of which the raising and lowering of the frame resulting when part of the supporting wheels encounter obstructions or depressions in the road bed, is minimized, so that the shocks and jarring due to an uneven road bed are substantially absorbed as they are transmitted to the frame. A further object of this invention is to provide a swivelled sub-frame structure having its supporting wheels equipped with brakes. It is also an object to provide brake operating means actuated through the king pin for controlling the brakes on the supporting wheels of a swivelled sub-frame. The invention consists in certain features and elements of construction, in combination, herein shown and described, as indicated by the claim.

In the drawings:

Figure 1 is a plan view of a chassis of a heavy duty trailer embodying the present invention.

Figure 2 is a view in side elevation.

Figure 3 is an enlarged plan view of the sub-frame, with parts broken away to show details of construction.

Figure 4 is an enlarged transverse sectional view taken as indicated at line, 4—4, on Figure 2; and indicating by dotted lines how the supporting wheels adapt themselves to an uneven road bed.

Figure 5 is a transverse sectional view through the pivot of a compensating axle beam, taken as indicated at line, 5—5, on Figure 3.

In trailer vehicles constructed especially for heavy duty service, such as for hauling relatively heavy or bulky objects, it is desirable to reduce the platform height to a minimum so as to facilitate and expedite loading and unloading. To acquire a relatively low loading height ordinarily necessitates dispensing with spring suspension of the frame, thus subjecting the frame to all shocks and vibration incident to the wheels traversing an uneven road bed. In some instances this may cause breakage or injury not only to the vehicle itself due to the constant strain on the parts, but also to the objects being hauled. The present invention, as will hereinafter appear, practically eliminates this difficulty.

Referring to the drawings, the vehicle chassis includes a main frame as indicated at 10, the forward end of which is of "gooseneck" construction having a deck frame, 11, vertically offset above the main frame. To the under side of the deck frame is swivelly connected a sub-frame, 12, at the forward end of which is mounted a draw bar, 13, for attachment to the rear end of a tractor vehicle in the usual manner. Both the main frame and deck frame, 11, are provided with flooring consisting of timbers, 14, partially indicated diagrammatically by dotted lines.

The rear end of the vehicle main frame is carried by supporting wheels, 16, preferably, eight in number, assembled to form two separate units of four wheels each positioned side by side transversely of the vehicle. The wheels of each unit are arranged in pairs of two each connected together by transverse axles, 17. Each of said axles, 17, of each unit is journaled centrally with respect to its two supporting wheels, on opposite ends of a longitudinally extending beam, 18, which is journaled adjacent its longitudinal center on a transversely extending shaft, 19. This shaft is supported in brackets, 20, secured to the channel side members, 21, and central channels, 22, of the main frame. This construction, as may be seen from Figure 2 of the drawings, permits supporting the main frame within the vertical limits of the wheels, thus obtaining a relatively low loading height. The ends of the beams, 18, are preferably threaded, so that the nuts, 23, may be adjusted to provide proper clearance for permitting swivelling of the axles, 17, with their pairs of supporting wheels on the ends of said beam. It will be understood that each unit may pivot independently of the other about the horizontal axis of the shaft, 19.

Although the rear end of the vehicle is subject to a greater portion of the load, and consequently strain and general wear and tear, I prefer to employ the same principle of compensating axle construction at the front end of the vehicle. Due to the fact that the supporting wheels, 26, are mounted on the sub-frame, 12, for steering movement, the construction as shown, is slightly different. The supporting wheels, 26, are also eight in number and are also assembled to form two units of four wheels each. The wheels of each unit are arranged in pairs, the wheels of each pair being mounted on the ends of cross axles, 27, which in turn are loosely journaled for swivelling movement, centrally between the wheels of said pairs, on the opposite ends of a beam, 28. The ends of the beam are threaded and provided with nuts, 29, to permit adjustment for affording proper freedom of the axles in swivelling thereon. The beams of said units are aligned for pivoting about a common horizontal axis, each beam being loosely mounted independently of the other on a stub shaft, 30, carried in brackets, 31, which are secured to channel members, 32, of the sub-frame, 12. To assist the steering of the vehicle it is desirable to arrange the supporting wheels as compactly as possible, especially so that the wheels, 26, will practically always be located within the width of the main frame throughout the range of steering adjustment of the sub-frame.

The compensating axle construction eliminates the major portion of the shocks and vibration imparted to the frame, incident to traversing an uneven road-bed. The force of the impact caused by the wheels striking obstructions or depressions is nearly all absorbed by the pivotal action, and the amount of raising or lowering of the frame and its load is reduced to a relatively small percentage of what would ordinarily result. Further, the wheels readily adapt themselves to crowned road-beds, such as indicated by dotted lines in Figure 4, without any substantial movement of the frame and its load. The action of this axle construction reduces the movements at the pivotal points and at the same time acts as a shock absorber. The advantages of such a construction perhaps will be more clearly seen from the following example: The effect is the same at either end of the vehicle; therefore let us assume that all except one of the wheels at the rear end of the vehicle rest on a flat even road-bed and that the excepted wheel has either encountered an obstruction or depression. Now since this wheel is connected to a cooperating wheel by an axle, 17, and this co-operating wheel is on level road-bed, then the amount of vertical movement of the axle at its transverse center or pivotal connection to the end of the beam, 18, is one-half of the vertical movement of the excepted wheel. However, since the beam is pivoted to swing about the horizontal axis of the shaft, 19, and since the pair of wheels at the opposite end of the beam are resting on level road-bed, the center of the beam at said shaft is moved vertically one-quarter of the amount of the actual movement of the wheel which encountered the obstruction or depression. Because the supporting wheels are arranged in two separate units at opposite ends of the shaft, 19, the actual amount of movement at the longitudinal center of the vehicle is again cut in half, thus reducing the amount of movement at the longitudinal center to one-eighth of the original amount of movement of the excepted wheel. Hence the force and strain incident thereto is reduced correspondingly.

The swivel connection between the sub-frame, 12, and the deck frame, 11, consists of a pair of cooperating turntable bearing plates, 35 and 36, attached to the upper and lower surfaces of the respective frames, and a hollow king pin consisting of a cast upper member, 37, secured to the upper side of the plate, 36, having an annular depending flange, 38, telescopically engaged in an annular sleeve, 39, of a lower cast member, 40, which is secured to the under side of plate, 35. This type of king pin permits distributing the lateral stress over a relatively larger area. The fifth wheel plates, 35 and 36, might be held against vertical separation by means of a bolt, but as shown, the center of the king pin is utilized to provide a connection for operating the brakes on the supporting wheels of the sub-frame, as will presently be described.

It may be noted in passing that increasing the number of load carrying wheels under a given area of body greatly reduces the strain on the road surface by distributing the load to an increased number of bearing points. Even though the wheels may be closely massed, there is no excessive load on any area of pavement. For this reason the impact of any single wheel at a cracked or imperfect section of road surface is less likely to increase the damage both by reason of the lighter load on the wheel and the reduced vertical movement of the total load of the vehicle.

The four front wheels, 26, of the sub-frame are equipped with brakes, including brake drums, 41, and operating rods, 42, which are connected to crank arms, 43, fixed on a transverse rock shaft, 44, extending through the channels, 32, and the brackets, 31. At the center of the shaft is fixed a crank arm, 45, to which is connected a rearwardly extending operating rod, 46, the opposite end of which is connected to the lower end of a lever, 47, fulcrumed at 48, in a bracket, 49, secured to the rear side of the sub-frame. To the upper end of the lever is connected an operating rod, 50, the opposite end of said rod being connected to the outer end of a laterally extending crank, 51, which is fixed on the lower end of a vertical stub shaft, 52, journaled in the king pin members, 37 and 40. On the upper end of the shaft is mounted a drum, 53, on which is wrapped a partial turn of a flexible cable, 54, extending obliquely rearwardly, and trained over a sheave, 55, thence wound around a horizontal shaft, 56, journaled in the deck frame, and having a hand wheel, 57, secured to its outer end for manipulation. (Incidentally the construction is such that the crank, 51, and the drum, 53, on shaft, 52, prevent vertical separation of the fifth wheel members.) Thus by rotating the hand wheel to tighten the cable, the brakes, 41, may be applied through the linkage just described. It will be understood that the brake operating linkage is provided with the usual springs (not shown) for releasing the brakes when the tension on the cable is relieved. Brakes may be provided on all the wheels of the sub-frame if desired, by arranging suitable linkage to the rock shaft, 44. By this brake operating mechanism the brakes may be applied when the sub-frame is at any angular position of steering adjustment relative to the main frame.

I claim:—

In combination, a heavy duty vehicle frame and supporting means therefor including a main axle extending transversely of the frame, a pair of transversely spaced beams each journaled at its mid-point on said axle, a short axle extending transversely at each end of each beam and pivotally mounted thereon with a wheel on said axle at each side of the pivot axis, whereby each pair of such wheels may swing vertically about the pivotal connection of their axle to the beam, and each beam may rock in a vertical plane about said main axle; said frame comprising a longitudinal member extending between the vertical planes in which the two beams rock and side members outside said planes, the main axle being rigidly secured to said side members and said longitudinal member, whereby the load on the frame is transmitted to the main axle at the middle portion thereof and at both its ends, and said axle serves to reinforce the frame transversely.

DURREL H. DAVIS.